United States Patent [19]
Meyerhofer et al.

[11] Patent Number: 6,141,362
[45] Date of Patent: Oct. 31, 2000

[54] REDUCTION OF B-INTEGRAL ACCUMULATION IN LASERS

[75] Inventors: David D. Meyerhofer, Spencerport; Oleg A. Konoplev, Rochester, both of N.Y.

[73] Assignee: The United States of America as represented by the United States Department of Energy, Washington, D.C.

[21] Appl. No.: 09/092,053

[22] Filed: Jun. 5, 1998

[51] Int. Cl.[7] ........................................... H01S 3/13
[52] U.S. Cl. ................... 372/30; 372/21; 372/25; 372/26; 372/29
[58] Field of Search ....................... 372/9, 20, 21, 372/25, 29, 30, 39, 40, 69, 70, 71, 72, 75, 26

[56] References Cited

U.S. PATENT DOCUMENTS

| | | | |
|---|---|---|---|
| 4,815,080 | 3/1989 | Chesnoy et al. | 372/30 |
| 4,817,097 | 3/1989 | Dufour | 372/25 |
| 4,896,119 | 1/1990 | Williamson et al. | 372/18 |
| 5,243,610 | 9/1993 | Murata | 372/21 |
| 5,317,577 | 5/1994 | Urakami et al. | 372/21 |
| 5,339,323 | 8/1994 | Hunter et al. | 372/25 |
| 5,742,634 | 4/1998 | Rieger et al. | 372/25 |
| 5,882,572 | 3/1999 | Lutze et al. | 264/400 |
| 5,982,790 | 11/1999 | Grossman et al. | 372/25 |
| 5,987,042 | 11/1999 | Staver et al. | 372/30 |

OTHER PUBLICATIONS

Y.H. Chuang et al., "Propagation of Light Pulses in a Chirped–Pulse–Amplification Laser," IEEE Journal of Quantum Electronics, vol. 29 No. 1, Jan. 1993, pp. 270–280.

M. D. Perry et al., "Self–phase Modulation in Chirped Pulse Amplification," Optics Letters, vol. 19 No. 24, Dec. 15, 1994, pp. 2149–2151.

M. Sheik–Bahae et al., "Dispersion of Bound Electronic Nonlinear Refraction in Solids," IEEE Journal of Quantum Electronics, vol. 27 No. 6, Jun. 1991, pp. 1296–1309.

Y.–H. Chuang et al., "Suppression of the Pedestal in a Chirped–Pulse Amplification Laser," Journal of the Optical Society of America, vol. 8 No. 6, Jun. 1991, pp. 1226–1235.

F. P. Strohkendl et al., "Highly Stable Amplification of Femtosecond Pulses," Journal of the Optical Society of America, vol. 11 No. 5, May 1994, pp. 742–749.

S. E. Stokowski et al., "Nd–Doped Laser Glass Spectroscopic and Physical Properties," Lawrence Livermore National Laboratory Report, M–95, Rev. 2, vol. 1, Nov. 1981, pp. 1–17.

E. W. Van Stryland et al., "Two Photon Absorption, Nonlinear Refraction, and Optical Limiting in Semiconductors," Optical Engineering, vol. 24 No. 4, Jul./Aug. 1985, pp. 613–623.

(List continued on next page.)

*Primary Examiner*—Brian Healy
*Attorney, Agent, or Firm*—Gary R. Drew; William C. Daubenspeck; William R. Moser

[57] ABSTRACT

A pulsed laser is provided wherein the B-integral accumulated in the laser pulse is reduced using a semiconductor wafer. A laser pulse is generated by a laser pulse source. The laser pulse passes through a semiconductor wafer that has a negative nonlinear index of refraction. Thus, the laser pulse accumulates a negative B-integral. The laser pulse is then fed into a laser amplification medium, which has a positive nonlinear index of refraction. The laser pulse may make a plurality of passes through the laser amplification medium and accumulate a positive B-integral during a positive non-linear phase change. The semiconductor and laser pulse wavelength are chosen such that the negative B-integral accumulated in the semiconductor wafer substantially cancels the positive B-integral accumulated in the laser amplification medium. There may be additional accumulation of positive B-integral if the laser pulse passes through additional optical mediums such as a lens or glass plates. Thus, the effects of self-phase modulation in the laser pulse are substantially reduced.

26 Claims, 6 Drawing Sheets

OTHER PUBLICATIONS

A. A. Said et al., "Determination of bound–electronic and free–carrier nonlinearities in ZnSe, GaAs, CdTe, and ZnTe," J. Opt. Soc. Am. B, vol. 9 No. 3, Mar. 1992, pp. 405–414.

M. J. LaGasse et al., "Femtosecond Measurements of the Nonresonant Nonlinear Index in AlGaAs," Appl. Phys. Lett., vol. 56, No. 5, Jan. 29, 1990, pp. 417–419.

M. J. LaGasse et al., "Femtosecond All–Optical Switching in AlGaAs Waveguides Using a Time Division Interferometer," Appl. Phys. Lett. vol. 54 No. 21, May 22, 1989, pp. 2068–2070.

Victor Mizrahi et al., "Two–Photon Absorption as a Limitation to All–Optical Switching," Optics Letters, vol. 14 No. 20, Oct. 15, 1989, pp. 1140–4042.

A. Agnesi et al., "Theory of Passive Negative Feedback in Passively Mode–Locked Nd:host Lasers," Optics Communications, vol. 81 No. 5, Mar. 1, 1991, pp. 306–310.

A. Agnesi et al., "Generation of Extended Pulse Trains of Minimum Duration by Passive Negative Feedback Applied to Solid–State Q–Switched Lasers," IEEE Journal of Quantum Electronics, vol. 28 No. 3, Mar. 1992, pp. 710–719.

Rebecca D. Cannon et al., "Stable, Intense Picosecond Generation Using Intracavity GaAs," Applied Optics, vol. 34 No. 30, Oct. 20, 1995, pp. 6334–6836.

A. V. Babushkin, "Stable Picosecond Solid State $YAlO_3:Nd^{3+}$ Laser for Streak Cameras Dynamic Evaluation," 19th International Congress on High Speed Photography and Photonics, SPIE vol. 1358, (1990), pp. 888–894.

A. Braun et al., "Compensation of Self–Phase Modulation in Chirped Pulse Amplification Laser Systems," Optics Letters, vol. 22 No. 9, May 1, 1997, pp. 615–617.

Camille Bibeau et al., "Pulse Length and Terminal–Level Lifetime Dependence of Energy Extraction for Neodymium–Doped Phosphate Amplifier Glass," IEEE Journal of Quantum Electronics, vol. 32 No. 8, Aug. 1996, pp. 1487–1496.

E. T. J. Nibbering et al., "Spectral Determination of the Amplitude and the Phase of Intense Ultrashort Optical Pulses," J. Opt. Soc. Am. B, vol. 13 No. 2, Feb. 1996, pp. 317–329.

T. R. Boehly et al., "Initial Performance Results of the Omega Laser System," Optics Communications 133 (1997), pp. 495–506.

X. Q. Zhou et al., "Femtosecond Carrier Kinetics in Low––Temperature–Grown GaAs," Applied Phys. Lett, vol. 61 No. 25, Dec. 21, 1992, pp. 3020–3022.

R. H. Lehmberg et al., "Two–Photon Resonantly–Enhanced Negative Nonlinear Refractive Index in Xenon at 248 nm," Optics Communications 121 (1995) pp. 78–88.

Thomas F. Boggess, Jr. et al., "Optical Limiting in GaAs," IEEE Journal of Quantum Electronics, vol. QE–21 No. 5, May 1985, pp. 488–494.

A. V. Babushkin et al., "Stable Picosecond $YAlO_3$:Nd Crystal Laser with Hybrid Mode Locking and Passive Intracavity Feedback Utilizing a GaAs Crystal," Sov. J. Quantum Electron. 19(10), Oct. 1989, pp. 1310–1311.

A. Del Corno et al., "Active–Passive Mode–Locked Nd:YAG Laser with Passive Negative Feedback," Optics Letters, vol. 15 No. 13, Jul. 1, 1990, pp. 734–736.

Anonymous, "Compact, Multijoule–Output, Nd:Glass, Large–Aperture Ring Amplifier," Laboratory for Laser Energetics, LLE Review, vol. 58, pp. 90–95.

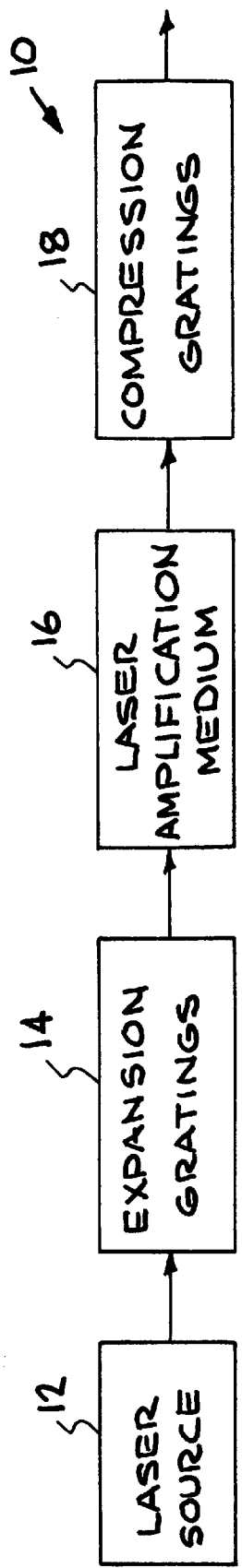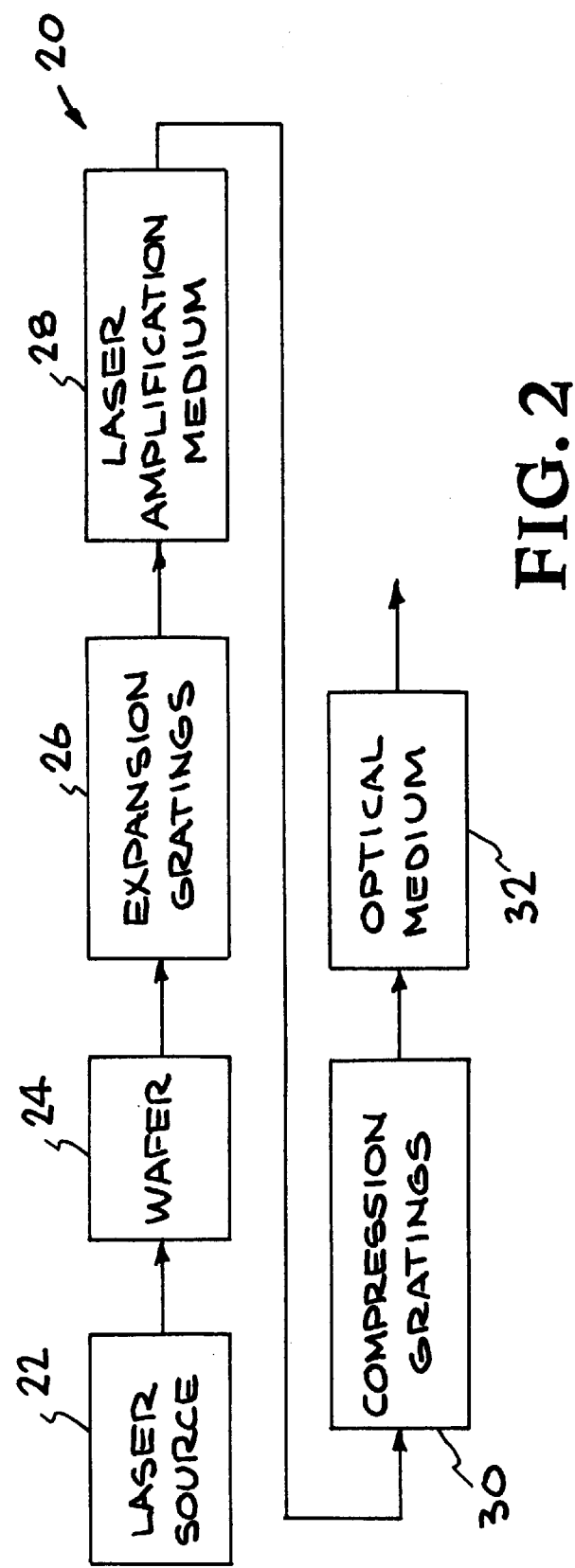

FIG. 8

| Parameters of Regenerative Amplifier | |
|---|---|
| Active element | Q-98 Nd:phosphate glass, 6%; L=115mm athermal rod, Ø=7mm; $n_2=3.5\cdot10^{-16}cm^2/W$ |
| Resonator | Stable g≈1/2, plano-concave, 100% end cavity dumped; 50% output flat ; round-trip time 11.8 ns |
| switch-in | external |
| Q-switch | λ/4 and step λ/4 voltage to PC |
| switch-out | external |
| Saturation fluence[6] | 4.7 J/cm² |
| Round trip net small-signal gain | 1.23 |
| Seed fluence ($J_{in}/J_{sat}$) | 2·10⁻⁹ |
| Pump fluence ($J_{sto}/J_{sat}$) | 1.035 |
| Peak fluence (without self focusing) | 0.146 |
| Peak pass | 86 |
| Round trip loss factor | 0.437 |
| Net gain | 67 dB |
| Total gain | 363 dB |
| waist on output coupler ($w_o$) | 750 μm at low intensities and 500±50μm at B ~ π/2 |

REDUCTION OF B-INTEGRAL ACCUMULATION IN LASERS

STATEMENT OF RIGHTS OF INVENTION

The United States Government has rights in this invention pursuant to Contract No. DE-FC03-92SF19460 between the United States Department of Energy and the University of Rochester.

BACKGROUND OF THE INVENTION

1. Field of the Invention

This invention relates to apparatus and methods for reduction of B-integral accumulation in laser systems.

2. Description of the Related Art

Lasers which emit a pulse that rapidly varies between low and high intensity values are useful in many applications including laser drilling, laser cutting, linear acceleration, X-ray holography, and X-ray generation. However, special problems can arise in working with these lasers due to effects produced by their intensity variations.

One particular problem occurs due to a well-known process called self-phase modulation. Self-phase modulation occurs where a laser pulse having a sufficiently high, variable intensity enters an optical material such as a laser amplification medium. At high intensity levels, the index of refraction of an optical material varies non-linearly as the intensity of an entering laser pulse varies in time. This non-linear change in the index of refraction causes phase changes in the temporal distribution of the laser pulse as it enters the optical material.

These phase changes occur because the changes in the index of refraction of the laser amplification medium cause corresponding changes in the phase velocity of the entering pulse. In fact, any optical material, for example, glass or lenses, that the pulse passes through will cause some corresponding change in the phase velocity. Portions of the laser pulse entering the laser amplification medium at higher values of the index of refraction will be slowed to a greater extent than portions of the laser pulse entering the medium at lower values of the index of refraction. In the laser pulses in which self-phase modulation occurs, the existing time distribution of the laser pulse is modified by the variable intensity of the laser pulse passing through the variable index of refraction in the medium.

Once the entire pulse has entered the amplification medium, the differing portions of the pulse corresponding to differing intensities continue to move at different velocities within the amplification medium causing temporal and spatial distortions. For temporal distortions, the amount of phase accumulated in the pulse will be dependent upon the amount of time during which the pulse moves within the laser amplification medium. This amount of time will depend both upon the length of the medium and upon the number of round trips within the medium in which the laser pulse is reflected. After a number of trips through the medium, the phase changes in the pulse may be substantial and create significant temporal structures such as "wings" or a "pedestal."

These effects of self-phase modulation are often undesirable in laser applications. In typical laser pulses, the temporal structure created in the laser pulse will decrease the peak intensity delivered by the pulse, lengthen the pulse duration, and disrupt the energy output of the pulse. Thus, by reducing the temporal structure created in a pulse by self-phase modulation, one can provide shortened pulse duration, give better pulse-to-pulse energy stability, and allow for overall higher energy extraction from the generated laser pulse.

A quantity termed the "B-integral" measures the total non-linear phase accumulated in the peak intensity of the pulse. The B-integral thus identifies the extent of the maximum distortion of the pulse occurring due to self-phase modulation. Reduction of the accumulated B-integral is used herein to describe the reduction of the effects generated by self-phase modulation to negligible impact.

FIG. 1 shows the use of expansion and compression gratings with a pulsed laser 10 to shorten the pulse duration and reduce the effects of self-phase modulation. A pulse, which is generated by the pulse laser source 12, first passes through the expansion gratings 14, which create linear changes in the phase of the pulse, i.e., initially lengthening the pulse duration. In the laser amplification medium 16, gain narrowing causes the pulse to narrow in bandwidth as only certain frequencies in the pulse are amplified. Compression gratings 18 receiving the pulse exiting from the amplification medium 16 undo the effects of the expansion gratings 14 in the gain-narrowed pulse such that the pulse phase is linearly changed in a reverse fashion.

An additional prior-known method of compensation for self-phase modulation in a laser pulse entails altering the orientation of the compression gratings so that the linear phase change caused by the compression gratings does not only reverse the phase change produced by the expansion gratings, but corrects some of the phase shift produced by self-phase modulation. However, as self-phase modulation creates a non-linear phase in the pulse, the linear phase change of the compression gratings can only be used to compensate the effects of self-phase modulation on average. Compression gratings thus cannot be used to compensate for self-phase modulation exactly. Radially variant temporal structure will remain in the recompressed pulse.

The B-integral also measures the amount of "self-focusing" occurring in a high-intensity laser beam or pulse in which the intensity varies in space rather than in time. For spatial distortions, self-focusing is produced by interactions between the spatial variations in intensity of the laser beam or pulse with the non-linear index of refraction as it enters a laser amplification medium. For example, in a laser beam, the higher-intensity portions of the beam entering the medium at an oblique angle will be deflected more sharply toward the normal to the medium surface than will lower-intensity portions of the beam entering the medium at the same angle. This occurs because the sine of the angle of refraction of the pulse portion will vary inversely with the index of refraction of the medium for an equal index of refraction (at the edge of the medium) and incident angle. Therefore, the higher the intensity of the pulse portion and the higher the index of refraction of the medium, then the smaller the refraction angle will occur. Similarly, the lower the intensity of the pulse portion and the lower the index of refraction, then the larger the refraction angle will occur.

In any medium with a positive nonlinear index of refraction, a laser with a centrally peaked intensity profile is susceptible to self-focusing. The central portion of the laser accumulates a higher phase delay than the edges, in an analogous manner to a beam passing through a lens, and it begins to focus. If the effective focal length is short enough, the laser can focus to a small spot before exiting the medium, leading to catastrophic damage. This problem is exacerbated in a laser amplifier where the pulse energy continues to increase as it undergoes focusing.

Thus, reduction or cancellation of the B-integral is also desirable to prevent destructive self-focusing of the highest-intensity portions of a laser beam or pulse where the B-integral measures the spatial, rather than temporal, effects of spatial variations in the intensity.

SUMMARY OF THE INVENTION

An object of the invention is to provide a laser where the B-integral accumulated in the laser pulse or laser beam is reduced using a semiconductor wafer.

The present invention has a laser pulse source, which generates a laser pulse that has a peak intensity in time. A laser amplification medium, which has a nonlinear index of refraction, receives the laser pulse from the laser pulse source and reflects the pulse a plurality of times to amplify the laser pulse. During this amplification process, the laser pulse undergoes a non-linear phase change due to self-phase modulation of the amplification medium. This phase change in the pulses peak intensity is measured by a total positive B-integral. The pulse also passes through a semiconductor wafer, which produces a further non-linear phase change, which is measured by a total negative B-integral. The characteristics of the amplification medium and the semiconductor wafer are chosen such that the effects to the pulse measured by the positive B-integral are canceled by the effects measured by the negative B-integral.

It is a further object of the present invention to provide a pulsed laser in which the temporal B-integral accumulated due to self-phase modulation in a laser pulse is reduced to a negligible value using a semiconductor wafer.

It is a further object of the present invention to provide a high-intensity laser in which the spatial B-integral accumulated due to self-focusing in a laser pulse or beam is reduced to a negligible value using a semiconductor wafer.

Yet another object of the present invention to provide an inventive semiconductor wafer formed of Gallium Arsenide (GaAs) in a laser system.

A still further object of the present invention to provide an inventive semiconductor wafer formed of Aluminum Gallium Arsenide (AlGaAs) in a laser system.

Other objects and advantages of the present invention will become apparent when the apparatus of the present invention is considered in conjunction with the accompanying drawings, specification, and claims.

BRIEF DESCRIPTION OF THE DRAWINGS

For a better understanding of the invention and further features thereof, reference is made to the following detailed description of the invention to be read in connection with the accompanying drawings, wherein:

FIG. 1 depicts a laser system of the prior art;

FIG. 2 shows a laser system of the first preferred embodiment of the present invention that uses a laser pulse source and a semiconductor wafer before the amplification medium;

FIG. 6A shows the radial profile of the pulse at the temporal peak of the pulse before and after reduction of the B-integral in the semiconductor wafer, and FIG. 6B shows the temporal profile of the pulse through the axis of the pulse;

FIG. 8 is a table showing the parameters of the Q-switched regenerative amplifier used in experimental embodiments of the inventive laser;

DESCRIPTION OF THE PREFERRED EMBODIMENT

Figure 3:
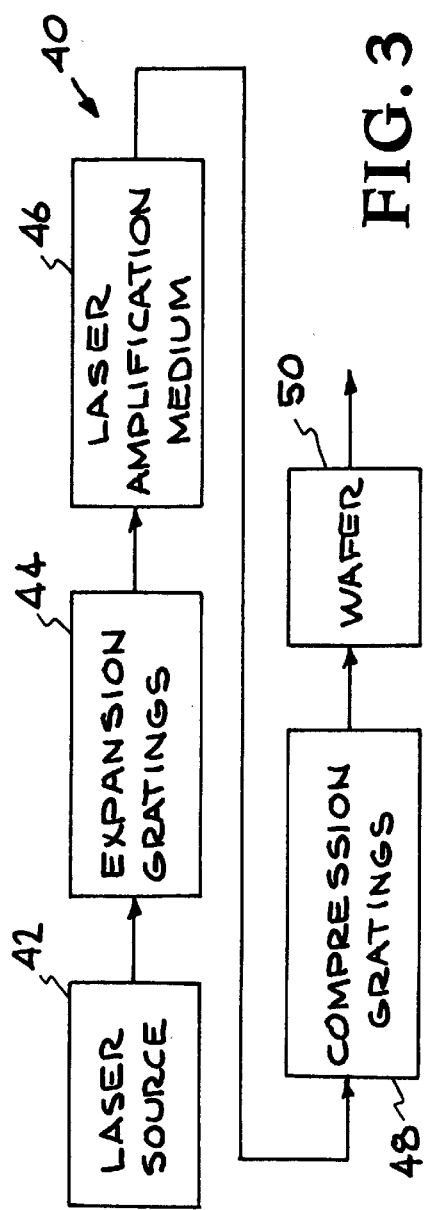
FIG. 3 shows a laser system of the second preferred embodiment of the present invention that uses a laser pulse source and a semiconductor wafer after the amplification medium.

While this invention is described in some detail herein, with specific reference to illustrated embodiments, it is to be understood that there is no intent to be limited to these embodiments. On the contrary, the aim is to cover all modifications, alternatives and equivalents falling within the spirit and scope of the invention as defined by the claims. For example, a Nd:YLF laser system works best with GaAs semiconductor wafers. However, other laser systems with laser pulses or beams at a different wavelength require specific compositions for the semiconductor wafers. Also, the description below will emphasize the B-integral accumulation in the laser amplification medium; however, the B-integral will accumulate in any optical medium that the laser beam or pulse passes through. Thus, B-integral accumulated for all of the optical mediums the pulse passes through should be taken into account when designing a system using the semiconductor wafer to cancel the positive B-integral.

The application of the inventive semiconductor wafer differs slightly between the cancellation of temporal and spatial B-integral accumulation. The temporal B-integral accrued due to self-phase modulation occurs only in laser pulses, which have sufficiently high peak intensity to trigger self-phase modulation. However, the intensity of the pulse need only be sufficiently high that there are significant changes in the index of refraction over the fluctuations in intensity. By contrast, the spatial B-integral accrued due to self-focusing will be significant only in high-intensity lasers, but can affect either laser pulses or continuous wave (cw) laser-beams. Beyond these differences, the process for reduction or cancellation of the positive B-integral is essentially the same. Thus, the discussion that follows will apply equally to reduction of both temporal and spatial B-integral unless otherwise noted.

Referring to FIG. 2, the first preferred embodiment of the present invention will be described. In a laser pulse, both temporal and spatial B-integral accumulation will occur. In contrast, the reduction of only the positive spatial B-integral applies to laser beams. Thus, this preferred embodiment will work for both a laser pulse or laser beam system; but the discussion will be directed to pulsed lasers for simplicity. The laser system 20 has a laser pulse source 22 (this could also be a laser beam source) that generates laser pulses. The laser pulse is passed through a semiconductor wafer 24, which has been specifically selected as described below for its specific characteristics. The semiconductor wafer 24 has a negative nonlinear index of refraction such that a negative B-integral accumulates in the laser pulse. The modified laser pulse is then passed through an expansion grating 26 before entering the laser amplification medium 28, which amplifies the peak intensity of the laser pulse. The laser amplification medium could be a Q-switched regenerative amplifier, a linear amplifier or any laser amplifier known in the art. In the laser amplification medium 28, the laser pulse accumulates a positive B-integral due to the positive nonlinear index of refraction of the medium. The ideal situation would be to have the negative B-integral produced in the semiconductor wafer completely cancel the positive B-integral accumulated in the laser amplification medium. The amplified laser pulse is then passed through a compression grating 30 before exiting the laser system 20.

In addition, the laser pulse may pass through other optical mediums 32 such as a lens or a glass plate. The laser pulse will accumulate additional positive B-integral when passing through these additional optical mediums, which could be located in any position along the beam line. Thus, the design of the semiconductor wafer, which produces negative B-integral, should include cancellation of this additional positive B-integral. Because the B-integral accumulations in the semiconductor wafer and the laser amplification medium (and other optical mediums) are characteristics of the device itself, i.e. self-phase modulation, one must specifically match the composition of semiconductor wafer with the wavelength of the laser pulse or beam. Therefore, the following calculations will help determine this match.

The calculation of the B-integral values is accumulated in the pulse will be dependent upon a time quantity t and a radial quantity r. For both temporal and spatial B-integral accumulation, t refers to the length of time that has passed since the pulse entered the laser amplification medium. With regard to temporal B-integral accumulation, in which the pulse features a changing intensity curve with respect to time, r refers to the position within the temporal intensity profile of the pulse. With regard to spatial B-integral accumulation, in which the pulse features a changing intensity curve with respect to space, r refers to the position within the spatial intensity profile of the pulse as it enters the amplification medium.

The total positive B-integral accumulated in the laser amplification medium and other optical mediums, $B_{pos}$, both temporal and spatial, can then be calculated as:

$$B_{pos}(r,t) = B_{maxpos} \cdot \frac{I_0(r,t)}{I_0(0,0)} \quad (1)$$

where $B_{maxpos}$ is the measured peak B-integral accumulated in the laser amplification medium; $I_0(r,t)$ is the intensity of the pulse at the coordinates r and t; and $I_0(0,0)$ will be the peak intensity of the pulse as it enters the amplification medium. For clarity, it will be assumed that for temporal B-integral accumulation, the pulse has a temporal intensity curve which is radially symmetrical and has a peak intensity at the axis of symmetry. The position r=0 then refers to the temporal position at the axis of symmetry of the temporal intensity curve, and non-zero r values apply to time values extending both positively and negatively radially out from r=0. However, it should be understood that r can refer to other means of identifying temporal positioning within the laser pulse. In that case, the position r=0 should refer to the temporal position at the peak intensity of the pulse.

Similarly, it will be assumed that for spatial B-integral accumulation, the pulse has a spatial intensity curve which is radially symmetrical and has peak intensity at the axis of symmetry. The position r=0 then refers to the spatial position at the axis of symmetry of the spatial intensity curve, and non-zero r values apply to spatial positions extending positively and negatively radially out from r=0. However, it should be understood that r can refer to other means of identifying spatial positioning within the laser pulse. In that case, r=0 should refer to the spatial position at the peak intensity of the pulse.

In the semiconductor, the negative temporal B-integral is also dependent on t and r. The negative B-integral accumulated in the semiconductor wafer will depend on two terms: a fast term caused by bound electrons in the semiconductor material, $B_{bnd}(r,t)$; and a slow term caused by excited free carriers, $B_{exc}(r,t)$. Once these terms are calculated, the total B-integral $B_{tot}(r,t)$ accumulated in the laser pulse after passage through both the laser amplification medium and the semiconductor wafer can be calculated as:

$$B_{tot}(r,t) = B_{pos}(r,t) + B_{bnd}(r,t) + B_{exc}(r,t) \quad (2)$$

In order to reduce the B-integral accumulated in the pulse, the initial intensity distribution $I_0(0,r)$ and the characteristics of the semiconductor wafer are chosen to minimize $B_{tot}(r,t)$. Thus, ideally the combined value of $-B_{bnd}(r,t)$ and $-B_{exc}(r,t)$ will equal $B_{pos}(r,t)$.

A semiconductor wafer is used as the inventive apparatus by which to reduce B-integral accumulation because all semiconductors have a particular bandgap energy range in which they will have a negative nonlinear index of refraction, which enables $B_{bnd}(r,t)$ and $B_{exc}(r,t)$ to take on negative values and thus to cancel $B_{pos}(r,t)$. Semiconductor wafers will have a negative nonlinear index of refraction in the range of bandgap energies $E_g$ such that $$\hbar\omega < E_g < 1.42\hbar\omega \quad (3)$$

where $\hbar\omega$ is the incident photon energy.

However, certain bandgap energies $E_g$ in that range are not as effective. The bandgap energy of the semiconductor is preferably chosen such that $x \geq 0.7$, where $x = \hbar\omega/E_g$. Although the region x: $0.5 < x < 0.7$ can be used, $B_{bnd}(r,t)$ and $B_{exc}(r,t)$ will have opposite signs, which will reduce the cancellation of $B_{pos}(r,t)$. However, $B_{exc}(r,t)$ will be greatly reduced due to reduction of the two-photon absorption coefficient $\beta_2$ which scales as:

$$\beta_2 \, x^{-6}(2x-1)^{3/2} \quad (4)$$

Because this will make it harder to compensate for higher values of $B_{pos}(r,t)$, the values of $E_g$ such that x: $0.5 < x < 0.7$ are undesirable.

The B-integral accumulated in the semiconductor can be derived from solving the coupled intensity and free generated carriers density equations. This first equation (5a) describes the change in intensity of the pulse with respect to these variables over the length of the semiconductor wafer:

$$\frac{d I(r,t,z)}{dz} = -\alpha I - \beta_2 I^2 - \sigma_{ex} NI \quad (5a)$$

This second equation (5b) describes the change in the free carrier electron density with respect to these variables over time:

$$\frac{d N(r, t, z)}{d t} = -\frac{N(r, t, z)}{\tau_{rel}} + \frac{\beta_2 I^2(r, t, z)}{2\hbar\omega} \quad (5b)$$

This third equation (5c) describes the change in the negative B-integral with respect to these variables as the pulse travels through the width of the semiconductor wafer:

$$\frac{d B(r, t, z)}{d z} = \frac{\omega}{c}(n_2 I - \sigma_r N) \quad (5c)$$

where r and t are the spatial and time coordinates as described above; z is the distance traveled into the thickness of the semiconductor wafer at those coordinates; $\alpha$ is the linear absorption coefficient of the semiconductor; $\beta_2$ is the two photon absorption coefficient; I is the irradiance; $\sigma_{ex}$ is the excited carrier absorption cross section; N is a unit of photo excited charge-carrier density; $\tau_{rel}$ is the characteristic relaxation time; $\omega$ is the angular frequency; c is the speed of light; $n_2$ is the nonlinear index of refraction in the semiconductor caused by bound electrons; and $\sigma_r$ is the change in the index of refraction in the semiconductor per unit of photo excited charge-carrier density N caused by free carrier electrons. $\sigma_r$ can be calculated as:

$$\sigma_r = \frac{2\Pi\hbar^2 e^2 E_p}{m_e n_0 E_g^3 x^2 (1-x)^2} \quad (6)$$

where e refers to the electron charge, $m_e$ refers to the electron mass, and $E_p$ refers to the Kane energy level.

For any particular semiconductor, the peak intensity of the initial pulse can be chosen to optimize the cancellation of B-integral. The semiconductor wafer may be polished to a particular reflectivity such that the excited carrier absorption term, $-\sigma_{ex}NI$, is small enough that it may be neglected. For example, in an embodiment where the semiconductor crystal used has $\sigma_{ex}=5\times10^{-18}$ cm$^2$, the term may be neglected up to critical intensities $I_{cr}\approx 2\hbar\omega/[\sigma_{ex}(1-R)\tau_{FWHM}]$ when R=0.3 is the reflectivity of the uncoated semiconductor crystal and $\tau_{FWHM}$ is the pulse duration.

From these equations, we can derive the two terms $B_{bnd}(r,t)$ and $B_{exc}(r,t)$ for the components of the B-integral at the exit plane of the semiconductor wafer, meaning that where L is the thickness of the semiconductor wafer, z=L:

$$B_{bnd}(r, t) = \frac{2\Pi n_2}{\lambda_{vac}\beta_2} \cdot \ln\{1 + \beta_2 I_0(r,t)(1-R)L_{eff}\} \quad (7)$$

$$B_{exc}(r, t) = -\frac{2\Pi}{\lambda_{vac}} \frac{\sigma_r \beta_2}{2\hbar\omega} \int_0^L dz\, e^{\frac{-t}{\tau_{rel}}} \left[ \int_{-\infty}^t e^{\frac{-t'}{\tau_{rel}}} I^2(r, t', z) d t' \right] \quad (8)$$

For $B_{bnd}$, $L_{eff}=(1-e^{-\alpha L})/\alpha$, and $\lambda_{vac}$ is the wavelength of the pulse in a vacuum. Due to the dependence of $B_{bnd}(r,t)$ on $I_0(r,t)$, the B-integral can be effectively canceled if the variables of the quantity $\beta_2 I_0(1-R)L_{eff}$ are picked such that $\beta_2 I_0(1-R)L_{eff} << 1$. For example, when a GaAs plate is used, $\beta_2 I_0(1-R)L_{eff}=0.15$.

L should be chosen to be small enough that it is smaller than the confocal beam parameter. For example, experimental results showed that L=400 $\mu$m was sufficiently small enough for the application described here.

The relaxation time of the semiconductor crystal, $\tau_{rel}$, should be chosen to be sufficiently smaller than the pulse width. Because the free carrier nonlinearity $\sigma_r N$ is proportional to the temporal integral of I$^2$, when $\tau_{rel}$ is longer than the pulse width $\sigma_r N$ cannot compensate for the accumulated B-integral in an optical material such as glass. Moreover, where $\tau_{rel}$ is longer than the pulse width and the intensity incident onto the semiconductor wafer $I_{inc}$ is higher than ~20 MW/cm$^2$, $\sigma_r N$ will become comparable to $B_{bnd}$, and will exceed $B_{bnd}$ by more than an order of magnitude where $I_{inc}\approx 1$ GW/cm$^2$. However, when shorter relaxation times $\tau_{rel}$ are used which are substantially less than the pulse width, $B_{bnd}$ and $\sigma_r N$ will have comparable contributions at sub GW/cm$^2$ intensities. For example, when using the GaAs wafers, $\tau_{rel}$ was estimated to be ~100 ps, which was about one third of the pulse duration. For such a short $\tau_{rel}$, $B_{exc}$ also will follow the intensity dependence.

Referring to FIG. 3, a second preferred embodiment of the present invention is shown. Whether the semiconductor wafer should be used as a pre-compensator or a post-compensator will depend on experimental conditions; for spatial B-integral accumulation, the semiconductor wafer will usually be used as a pre-compensator to avoid the risk of damage to the amplification medium from the self-focusing. Note that damage will not occur to the semiconductor due to the negative B-integral because the higher-intensity parts of the pulse will be refracted further away from the normal of the semiconductor surface than the lower-intensity parts of the beam, rather than toward the normal. However, the semiconductor wafer 50 could be placed after the pulse has been amplified as shown in FIG. 3.

The laser system 40 has a pulse laser source 42 (this could also be a beam laser source) that generates laser pulses. The laser pulse is passed through a expansion grating 44 before entering the laser amplification medium 46, which amplifies the peak intensity of the laser pulse. In the laser amplification medium 46, the laser pulse accumulates a positive B-integral due to the positive nonlinear index of refraction of the medium. The amplified pulse is then passed through the compression grating 48 to remove the temporal phase accumulated by the expansion grating 44. The pulse then passes through the semiconductor wafer 50, which has the desired characteristics (a negative nonlinear index of refraction) such that a negative B-integral accumulates in the amplified pulse. Similar to the first preferred embodiment, it is preferred that the negative B-integral produced in the semiconductor wafer completely cancels the positive B-integral accumulated in the laser amplification medium and other optical medium (not shown).

Figure 4:
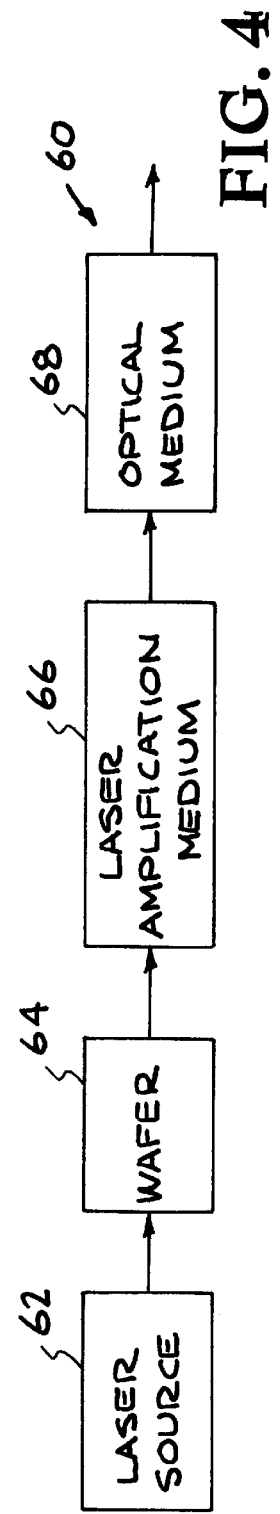
FIG. 4 shows a laser system of the third preferred embodiment of the present invention that generates a laser beam.

Referring to FIG. 4, a third preferred embodiment will be described. Temporal B-integral is an important factor in laser pulse systems. However, some laser beam systems don't have temporal B-integral problems and only the spatial B-integral must be reduced or eliminated. Therefore, this laser system 60 does not include the gratings. The laser beam is generated by laser source 62. The laser beam then passes through the semiconductor wafer 64 to accumulate a negative spatial B-integral. The laser beam then passes the amplification medium 66 to amplify the laser beam, which accumulates a positive spatial B-integral that should cancel the negative spatial B-integral already accumulated in the laser beam. Also, the laser beam could accumulate additional positive B-integral when passing through the optical medium 68. The characteristics of the semiconductor wafer 64 should be designed to cancel the additional positive B-integral.

Figure 5:
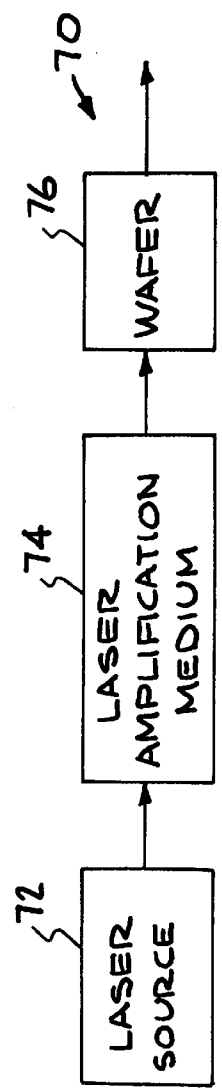
FIG. 5 shows a laser system of the fourth preferred embodiment of the present invention that generates a laser beam.

FIG. 5 shows the fourth preferred embodiment of the present invention. Similar to the second preferred embodiment, the semiconductor wafer 76 is used as a post-compensator. However, there is a risk of damage to the amplification medium 74 from the effects of self-focusing. This laser system 70 generates a laser beam by the laser source 72. The laser beam passes through the amplification medium 74 and other optical mediums (not shown) such that the laser beam accumulates a positive spatial B-integral. The negative spatial B-integral accumulated in the semiconductor wafer 76 is canceled before the amplified laser beam is emitted from the laser system 70.

In general, use of a semiconductor wafer to reduce spatial B-integral accumulation will be justifiable where the positive B-integral accumulated is sufficiently high and both the linear and two photon absorption losses produced in the semiconductor wafer are relatively small. Note that coupling (fresnel) losses due to the addition of the semiconductor wafer can be removed by an appropriate anti-reflection (AR) coating. As the optical switching inequalities $n_2/\beta_2\lambda > B/2\pi$ and $\Delta n/\alpha\lambda > B/2\pi$ are satisfied in GaAs for B as large as $\pi$, use of the inventive apparatus will be justified for such B-integral values.

It should be noted that the estimated dispersion (wavelength dependence) of $\alpha$, $\beta$, or $n_2$ will be negligible within a 10 Å spectrum.

Figure 6B:
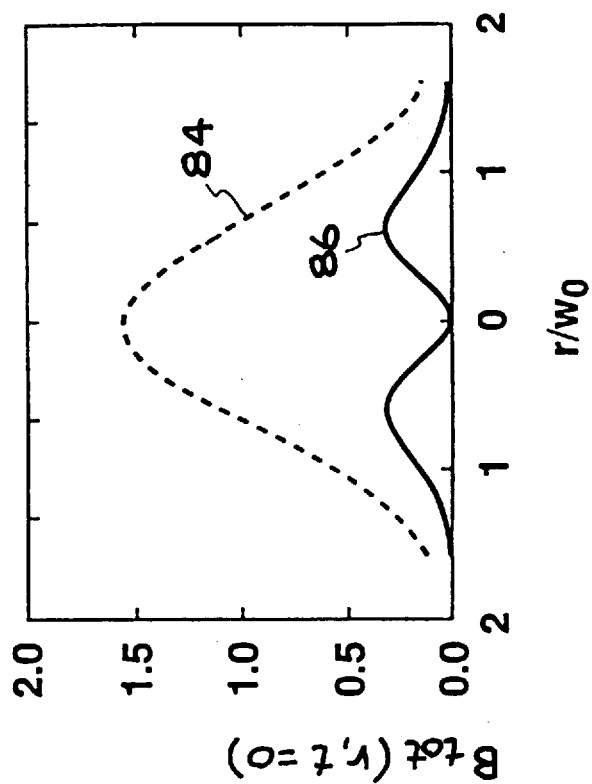
FIGS. 6A and 6B depict graphs of a pulse having a pre-accumulated B-integral.
Figure 6A:
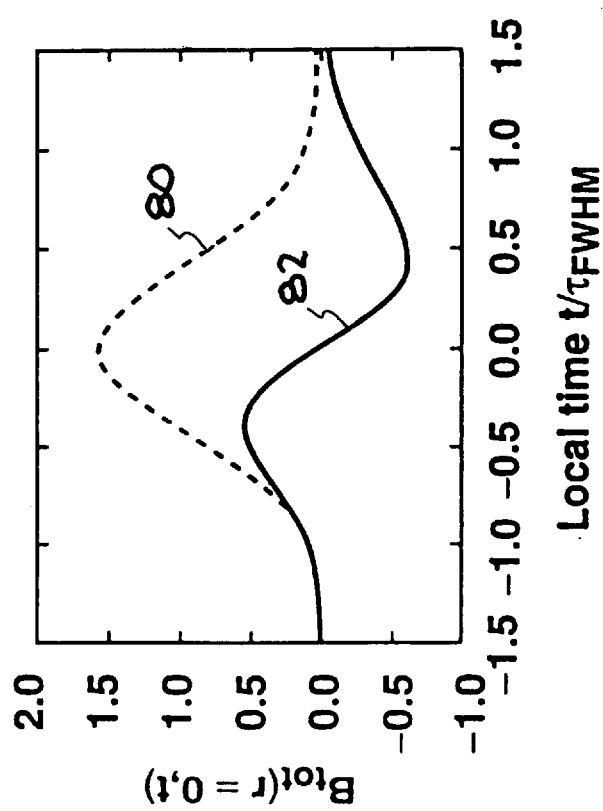

As an example, these equations were solved using GaAs as the semiconductor wafer and Nd:YLF oscillator as the laser source. FIGS. 6A and 6B show the calculated effects of B-integral reduction in a laser pulse with accumulated positive B-integral $B_{pos}(r,t)$ of $\pi/2$. The theoretical values of a GaAs plate are: $\alpha=2.3$ cm$^{-1}$, $\beta_2=20$ cm/GW, $n_2=-4.2\times10^{-13}$ cm$^2$/W, $L=400$ $\mu$m, $\sigma_r=5.4\times10^{-21}$ cm$^3$, $I_{inc}=I_0=285$ MW/cm$^2$, $R=0.3$, pulse duration $\tau_{FWHM}=300$ ps, and $\tau_{rel}=\frac{1}{3}\tau_{FWHM}$. $\sigma_r$ was calculated for $E_g=1.4$ eV and where the incident photon energy was 1.177 eV. FIG. 6A shows the radial profile of the pulse at the temporal peak of the pulse. The dotted line 80 of FIG. 6A shows the calculation of $B_{tot}(0,t)$ where the pulse is not compensated by the GaAs plate, and the solid line 82 of FIG. 6A shows the calculation of $B_{tot}(0,t)$ where the pulse is compensated by the GaAs plate. As shown in FIG. 6A, the maximum value of $B_{tot}(0,t)$ is substantially reduced by use of the GaAs plate.

FIG. 6B shows the temporal profile of the pulse through the axis of the pulse. The dotted line 84 of FIG. 6B shows the calculation of $B_{tot}(r,0)$ where the pulse is not compensated by the GaAs plate, and the solid line 86 of FIG. 6B shows the calculation of $B_{tot}(r,0)$ where the pulse is compensated by the GaAs plate. FIG. 6B similarly shows substantial reduction of the peak B-integral through the use of the GaAs plate.

In another example, further computation shows that for a slightly thicker semiconductor wafer and for smaller intensities the peak total B-integral can be reduced by another factor of two. If special semiconductor crystals are grown having fast relaxation times or laser pulses with longer pulse durations are used such that the ratio between the relaxation time of the semiconductor $\tau_{rel}$ and the pulse duration is lessened, the B-integral will be reduced to negligible values.

Figure 7B:
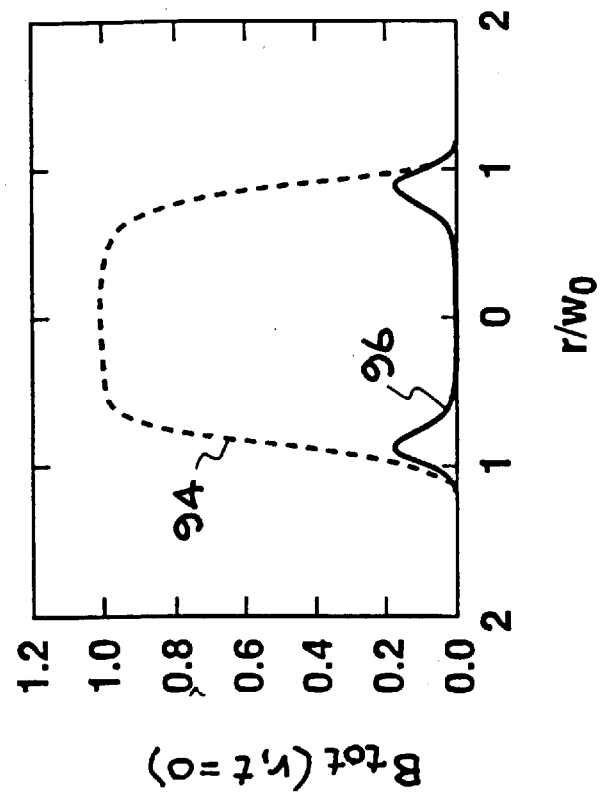
FIGS. 7A and 7B depict graphs showing the same profiles as FIGS. 6A and 6B, respectively, where the initial pulse and semiconductor wafer have different characteristics.
Figure 7A:
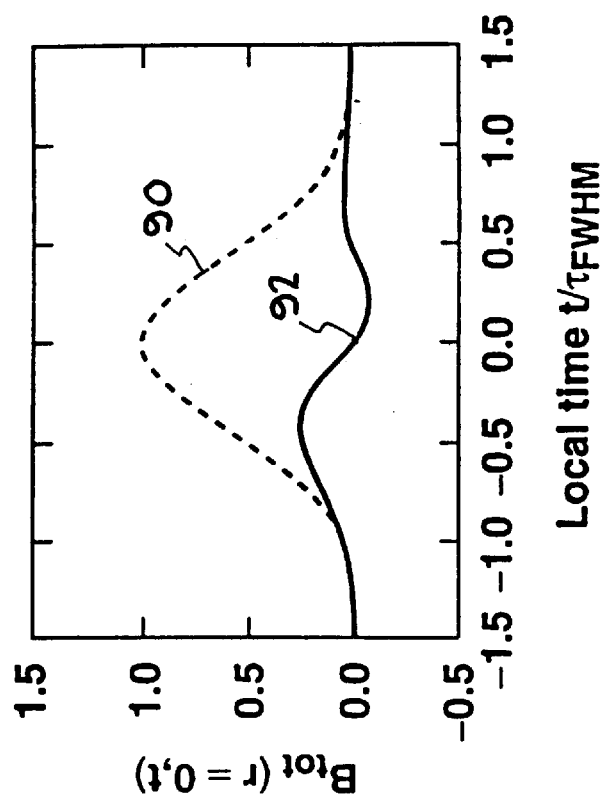

FIGS. 7A and 7B show the cancellation of spatial and temporal B-integral in a pulse with a pre-accumulated B-integral of 1 with a GaAs wafer, where $\alpha=1.0$ cm$^{-1}$, $\beta_2=20$ cm/GW, $n_2=-4.2\times10^{-13}$ cm$^2$/W, $L=2$ mm, $\sigma_r=5.4\times10^{-21}$ cm$^3$, $I_{inc}=I_0=90$ MW/cm$^2$, $R=0.3$, pulse duration $\tau_{FWHM}=1$ ns, and $\tau_{rel}=\frac{1}{10}\tau_{FWHM}$. $\sigma_r$ was calculated for $E_g=1.4$ eV and where the incident photon energy was 1.177 eV. The dotted line 90 of FIG. 7A shows the calculation of $B_{tot}(0,t)$ where the pulse is not compensated by the GaAs plate, and the solid line 94 of FIG. 7A shows the calculation of $B_{tot}(0,t)$ where the pulse is compensated by the GaAs plate. The dotted line 94 of FIG. 7B shows the calculation of $B_{tot}(r/w_0,0)$ (where $2\times(w_0)$ is the beam diameter (or beam waist) on the output coupler) where the pulse is not compensated by the GaAs plate, and the solid line 96 of FIG. 7B shows the calculation of $B_{tot}(r/w_0,0)$ where the pulse is compensated by the GaAs plate. The phase accumulated after the reduction of the B-integral is more than five times smaller than the initial phase and represents reduction of the phase error from $\lambda/6$ to $\lambda/30$.

To verify these calculations, an experimental apparatus similar to the first preferred embodiment shown in FIG. 2 employed an Nd:YLF oscillator coupled into a 0.8 km single-mode fiber to generate 1.053 $\mu$m chirped pulses. The pulses were subsequently expanded in a conventional single-grating lens and mirror stretcher to a duration of 0.45 ns. Single pulses were seeded into a Q-switched regenerative amplifier. The parameters of the regenerative amplifier are shown in FIG. 8. Due to strong gain narrowing in the regenerative amplifier, the stretched pulse became Gaussian in time, with a 0.3 ns duration.

On each pass of the pulse envelope through the regenerative amplifier, a B-integral accumulated. Near the peak of the Q-switched envelope, the B-integral accumulated at approximately 0.18 per pass. In several experimental runs, differing total B-integrals were accumulated in output pulses by varying the switch-out time of the pulse relative to the peak of the pulse train in the Q-switched envelope. These pulses were passed through a pair of compression gratings to compress the pulse duration as calculated by the full width of the pulse at the intensity value of half the maximum intensity (FWHM). An autocorrelator was used to measure the pulse durations.

The B-integrals were estimated for the Q-switched regenerative amplifier using the Frantz-Novdik system of equations. A 50% round-trip loss was calculated to be due to the output coupler, and an additional 6.3% intra cavity loss was estimated as derived from equations. These losses agreed well with a 55% round-trip loss rate measured for cold cavity. It was estimated that there is 25% systematic error and 10% random error in B-integral evaluation. However, the final simulation values of output energetic parameters were indistinguishable from those measured in the experiments.

Figure 9:
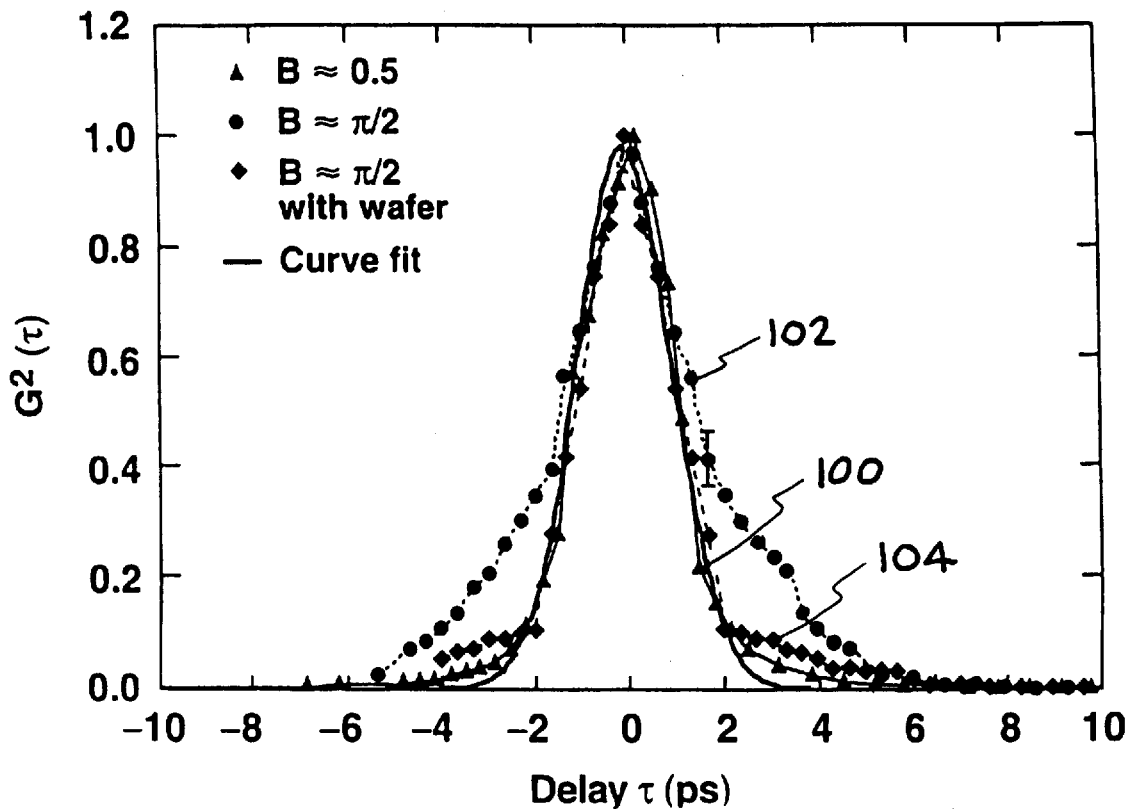
FIG. 9 is a graph plotting the temporal distribution of three pulses having varied uncompensated and compensated B-integral values.

Two pulses generated were focused upon as references for evaluation of the use of a GaAs plate to reduce the B-integral in the final output pulse. FIG. 9 graphs the radial distribution as represented by the following proportional equation:

$$G^2(\tau) \propto \int_{-\infty}^{\infty} I(t)I(t-\tau)dt \qquad (9)$$

that is, the pulse distribution by the output of the second order autocorrelator function $G^2(\tau)$ versus delay time $\tau$. Line 100 of FIG. 9, indicated by solid triangles, shows a pulse having a low accumulated B-integral of approximately 0.5 and a compressed pulse duration after passing through the compression gratings which was measured by the autocorrelator as approximately 1.65 ps. This pulse was generated by switching a pulse out of the regenerative amplifier 6 to 7 pulses before the peak of the Q-switched pulse envelope. Line 102 of FIG. 9, indicated by solid circles, shows a pulse having an accumulated B-integral of 1.6 ($\sim\pi/2$) and a compressed pulse duration measured at 2.0±0.1 ps. It shows significant non-Gaussian structure, as expected.

To reduce the accumulated B-integral, a polished GaAs plate with a thickness of 400 µm was inserted before the compression gratings. The small thickness of the plate was possible because the nonlinear index of refraction for GaAs is about three orders of magnitude greater than the index of refraction of the regenerative amplifier material. This thickness of the plate was thus smaller than the confocal beam parameter.

The plate had a negative nonlinear index of refraction which was estimated at $-4.2\times10^{-11}$ cm$^2$/W for 1.053 µm pulses by using an experimental value of $-3.3\times10^{-10}$ esu obtained for 1.064 µm pulses and applying scaling laws for $n_2(\hbar\omega)/E_g$. A pulse having an accumulated B-integral of $\pi/2$ generated as for line 102 of FIG. 9 above was fed through the GaAs block. Line 104 of FIG. 9, indicated by solid diamonds, shows that the measured pulse duration for this pulse was reduced to the original value of 1.65±0.1 ps measured for the low B-integral pulse. It can be seen in FIG. 9 that the temporal structure of the pulse in line 104 was significantly reduced.

Figure 10:
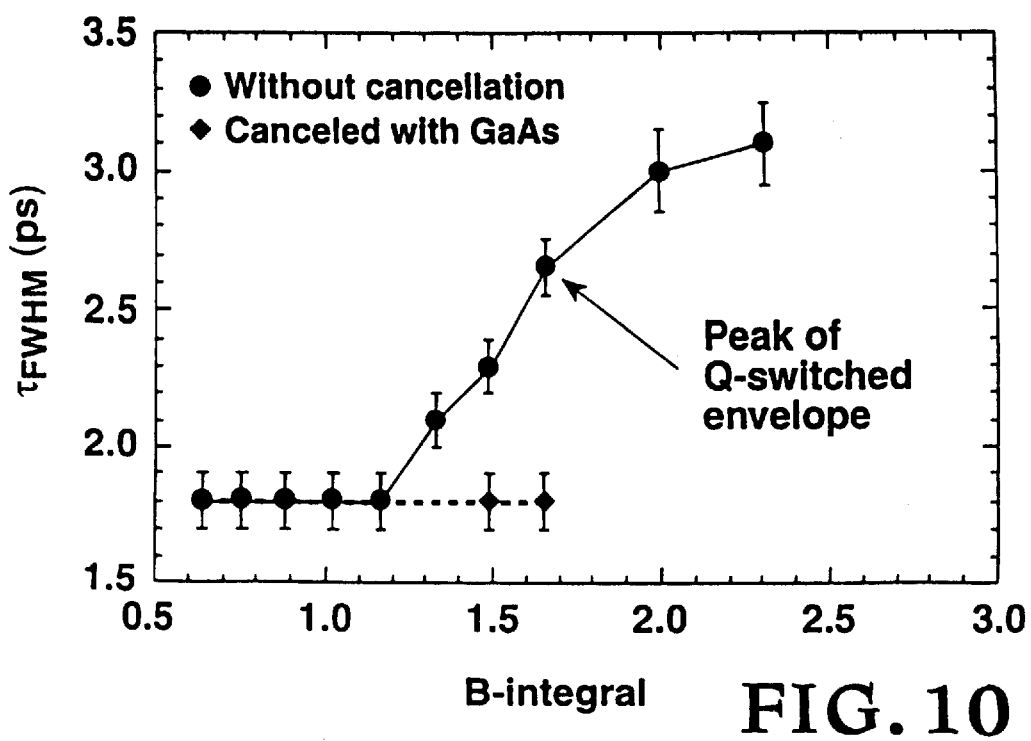
FIG. 10 is a graph plotting the measured compressed pulse duration of a pulse not passing through the inventive semiconductor crystal against the measured pulse duration of a pulse passing through the inventive semiconductor crystal for various B-integral values.

FIG. 10 shows the compressed pulse durations (FWHM) of the two reference pulses and the compensated pulse as a function of their cumulative B-integrals; the pulse durations were deconvolved from the autocorrelator output $G^2(\tau)$. The solid circles show that the pulse duration increases in the absence of B-integral cancellation, while the diamonds show that with cancellation, the pulse duration remains constant up to a B-integral of approximately $\pi/2$. Note that the solid circles showing the uncompensated pulses show a distinctive knee at B-integral values between 1 and 1.5, as expected.

As another example, Aluminum gallium arsenide (AlGaAs) can be used as the semiconductor material when a Chromium Fosterite or Titanium Sapphire laser system, which generates a laser pulse of $\lambda\approx850$ nm, is used as the laser source. Using the above equations, the following values would be used: $\alpha=1$ cm$^{-1}$, $n_2\approx-5\times10^{-13}$ cm$^2$/W, $\sigma_r\approx5\times10^{-21}$ cm$^3$, and $\beta_2=10$ cm/GW. It should be noted that for $x\approx0.92$, the wavelength dependence of the parameters should be accounted for.

In another example, Cadmium Selenide (CdSe) has the appropriate characteristics to cancel the accumulated B-integral for a Titanium Sapphire laser systems, which operates at a wavelength of 800 nm.

Although the foregoing invention has been described in some detail by way of illustration for purposes of clarity of understanding, it will be readily apparent to those of ordinary skill in the art in light of the teachings of this invention that certain changes and modifications may be made thereto without departing from the spirit or scope of the appended claims.

It is claimed:

1. A pulsed laser having a minimal B-integral accumulated in a laser pulse, comprising:
    a laser pulse source generating a laser pulse having a peak intensity;
    a semiconductor wafer modifying said laser pulse at said peak intensity such that said laser pulse accumulates a negative B-integral during a negative non-linear phase change; and
    a laser amplification medium amplifying said laser pulse at said peak intensity such that said laser pulse accumulates a positive B-integral during a positive non-linear phase change, wherein said negative B-integral produced by said semiconductor wafer substantially cancels said accumulated positive B-integral.

2. The pulsed laser of claim 1, wherein said semiconductor has a negative nonlinear index of refraction.

3. The pulsed laser of claim 1, wherein said laser amplification medium has a positive nonlinear index of refraction.

4. The pulsed laser of claim 3, wherein said laser amplification medium is one of a Q-switched regenerative amplifier and a linear amplifier.

5. The pulsed laser of claim 1 further comprising at least one optical medium such that said laser pulse accumulates additional positive B-integral that will be substantially canceled by said negative B-integral produced by said semiconductor wafer.

6. The pulsed laser of claim 5, wherein said at least one optical medium is one of a lens and a glass plate.

7. The pulsed laser of claim 1, wherein said laser pulse first passes through said semiconductor wafer and then passes through said laser amplification medium.

8. The pulsed laser of claim 1, wherein said laser pulse first passes through said laser amplification medium and then passes through said semiconductor wafer.

9. The pulsed laser of claim 1 further comprising:
    an expansion grating modifying said laser pulse before entering said amplification medium; and
    a compression grating modifying said laser pulse emitted from said amplification medium.

10. The pulsed laser of claim 1, wherein said semiconductor wafer is a polished plate of Gallium Arsenide and said laser pulse source is a Nd:YLF oscillator.

11. The pulsed laser of claim 1, wherein said semiconductor wafer is a polished plate of Aluminum Gallium Arsenide and said laser pulse source is one of a Chromium Fosterite oscillator and a Titanium Sapphire oscillator.

12. The pulsed laser of claim 1, wherein said semiconductor wafer is a polished plate of Cadmium Selenide and said laser pulse source is a Titanium Sapphire oscillator.

13. The pulsed laser of claim 1, wherein said positive B-integral has temporal and spatial effects on said laser pulse that substantially cancel the temporal and spatial effects of said negative B-integral.

14. A laser having a minimal B-integral accumulated in a laser beam, comprising:
    a laser beam source generating a laser beam;
    a semiconductor wafer modifying said laser beam by accumulating a negative B-integral; and
    a laser amplification medium amplifying said laser beam such that said laser beam accumulates a positive B-integral during a positive non-linear phase change, wherein said accumulated negative B-integral from said semiconductor wafer substantially cancels said accumulated positive B-integral.

15. The laser of claim 14, wherein said semiconductor has a negative nonlinear index of refraction and said laser amplification medium has a positive nonlinear index of refraction.

16. The laser of claim 15, wherein said laser amplification medium is one of a Q-switched regenerative amplifier and a linear amplifier.

17. The laser of claim 14 further comprising at least one optical medium such that said laser beam accumulates additional positive B-integral that will be substantially canceled by said negative B-integral produced by said semiconductor wafer.

18. The laser of claim 17, wherein said at least one optical medium is one of a lens and a glass plate.

19. The laser of claim 14, wherein said laser beam first passes through said semiconductor wafer and then passes through said laser amplification medium.

20. The laser of claim 14, wherein said laser beam first passes through said laser amplification medium and then passes through said semiconductor wafer.

21. The laser of claim 14, wherein said semiconductor wafer is a polished plate of Gallium Arsenide and said laser beam source is a Nd:YLF oscillator.

22. The laser of claim 14, wherein said semiconductor wafer is a polished plate of Aluminum Gallium Arsenide and said laser beam source is one of a Chromium Fosterite oscillator and a Titanium Sapphire oscillator.

23. The laser of claim 14, wherein said semiconductor wafer is a polished plate of Cadmium Selenide and said laser beam source is a Titanium Sapphire oscillator.

24. The laser of claim 14, wherein said positive B-integral has spatial effects on said laser beam that substantially cancel the spatial effects of said negative B-integral.

25. A laser having a minimal B-integral accumulated in an emitted laser light, comprising:

source means for generating a laser light;

semiconductor means for modifying said laser light such that said laser light accumulates a negative B-integral; and laser amplification means for amplifying said laser light from said source means such that said laser light accumulates a positive B-integral, wherein said negative B-integral produced by said semiconductor means substantially cancels said accumulated positive B-integral.

26. The laser of claim 25, wherein said laser light first passes through said semiconductor means before entering said laser amplification means.

* * * * *